US008217121B2

(12) United States Patent
Tonelli

(10) Patent No.: US 8,217,121 B2
(45) Date of Patent: Jul. 10, 2012

(54) AROMATIC HYDROGENATED POLYMERS CONTAINING FLUORINE

(75) Inventor: Claudio Tonelli, Monza (IT)

(73) Assignee: Solvay Solexis S.p.A., Bollate (MI) (IT)

( * ) Notice: Subject to any disclaimer, the term of this patent is extended or adjusted under 35 U.S.C. 154(b) by 381 days.

(21) Appl. No.: 12/669,019

(22) PCT Filed: Jul. 16, 2008

(86) PCT No.: PCT/EP2008/059306
§ 371 (c)(1),
(2), (4) Date: Jan. 13, 2010

(87) PCT Pub. No.: WO2009/010533
PCT Pub. Date: Jan. 22, 2009

(65) Prior Publication Data
US 2010/0197869 A1    Aug. 5, 2010

(30) Foreign Application Priority Data

Jul. 18, 2007    (EP) .................................... 07425442

(51) Int. Cl.
C08F 283/00    (2006.01)
C08G 63/91    (2006.01)
C08G 69/48    (2006.01)
C08G 85/00    (2006.01)
C08L 101/04    (2006.01)
(52) U.S. Cl. .................. 525/338; 525/334.1; 525/359.5; 525/416
(58) Field of Classification Search .................. 525/338, 525/334.1, 359.5, 416
See application file for complete search history.

(56) References Cited

U.S. PATENT DOCUMENTS

| 3,876,617 | A | 4/1975 | Caporiccio et al. |
| 3,899,563 | A | 8/1975 | Oxenrider et al. |
| 5,109,103 | A | 4/1992 | Re et al. |
| 5,143,963 | A | 9/1992 | Sterling et al. |
| 5,286,773 | A | 2/1994 | Sterling et al. |
| 5,326,823 | A | 7/1994 | Rolando et al. |
| 5,332,798 | A | 7/1994 | Ferreri et al. |
| 5,508,380 | A | 4/1996 | Turri et al. |
| 6,683,128 | B2 | 1/2004 | Turri et al. |

FOREIGN PATENT DOCUMENTS

| JP | 03045606 A | 2/1991 |
| JP | 03056506 A | 3/1991 |
| JP | 03234706 A | 10/1991 |
| JP | 04277586 A | 10/1992 |
| JP | 05078419 A | 3/1993 |
| WO | WO 2006023921 A2 | 3/2006 |

OTHER PUBLICATIONS

Louati et al. ("Graft Copolymerization of Polyester Fibers with a Fluorine-Containing Monomer" Textile Research Journal, vol. 69, 1999, pp. 381-387).*

Levi, M. et al., "Model Structures of Thermoplastic Polyesters Having Regularly Alternated Aromatic and Fluorinated Segments", Journal of Polymer Science, Part A : Polymer Chemistry, 1998, vol. 36, p. 939-947, John Wiley & Sons, Inc.
Tonelli, C. et al., "New Fluorinated Thermoplastic Elastomers", Journal of Applied Polymer Science, 1996, vol. 59, p. 311-327, John Wiley & Sons, Inc.
Tonelli, C. et al., "New Fluoro-Modified Thermoplastic Polyurethanes", Journal of Applied Polymer Science, 2003, vol. 87, p. 2279-2294, Wiley Periodicals, Inc.
Strepparola, E. et al., "Elastomeric Polyimides from a,Ω-Bis(aminomethyl) poly[oxy(perfluoroalkylenes)] and Tetracarboxylic Acids", Ind. Eng. Chem. Prod. Res. Dev., 1984, vol. 23 (4), p. 600-605, ACS.
Caporiccio, G. et al., "Low Temperature Elastomeric Polyamides Containing Perfluorinated Polyether Building Blocks", Makromol. Chem., 1983, vol. 184, p. 935-947.
Kawase, T. et al., "Novel Fluoroalkylation of Polyester Surfaces: Grafting with Perfluoroalkanoyl Peroxides", Textile Research Journal, 1994, vol. 64 (7), p. 375-380, XP002465047, SAGE publication.
Louatti, M. et al., "Graft Copolymerization of Polyester Fibers with a Fluorine-Containing Monomer", Textile Research Journal, 1999, vol. 69 (5), p. 381-387, XP002465046, SAGE publication.
Zhou, Z.-B. et al., "Modification of polystyrene via aromatic per(poly)fluoroalkylation by per(poly) fluorodiacyl peroxides", Journal of Fluorine Chemistry, 1996, vol. 79, p. 1-5, XP002465045, Elsevier Science S.A.
Kawase, T. et al., "Surface modification of silk fabric with perfluoroalkanoyl peroxides" (lang.: Japanese), Sen'i Gakkaishi, 1995, vol. 51(2), p. 86-94, CAS 123:172469.
Sawada, H. et al., "Synthesis and properties of poly(carbonates) possessing fluoroalkyl groups on the aromatic nuclei" (lang.: Japanese), Zairyo Gijutsu (1997), 15(2), 35-39, CAS 126:251555.
Zhou, Z.-B. et al., "Modification of linear triblock copolymer SBS via olefinic per(poly)fluoroalkylation by per(poly) fluorodiacyl peroxides", Journal of Fluorine Chemistry, 2000, vol. 104(2), p. 285-290, Elsevier Science S.A.
Zhou, Z.-B. et al., "Modification of SBS polymers by perfluoroalkylation" (lang.: Chinese), Yingyong Huaxue, 2000, vol. 17(5), p. 516-519, CAS 134:57090.

(Continued)

Primary Examiner — Kelechi Egwim
(74) Attorney, Agent, or Firm — Beatrice C. Ortego

(57) ABSTRACT

Aromatic hydrogenated polymers comprising perfluoropolyether (PFPE) chains bonded to the aromatic rings to form sequences randomly distributed in the polymer structure, having the formula (I): $(T_1-CF_2O-Rf-CF_2)_n-T_3$ in which: n is an integer from 1 to 10; $T_1$ is an aromatic group of the backbone of the hydrogenated polymer, or alternatively condensed aromatic groups; $T_3$ may be equal to $T_1$, or alternatively a functional group —COOH or —COF; Rf is a (per)fluoropolyoxyalkylene chain, in which the starting hydrogenated aromatic polymers are obtained by polycondensation, stepwise polyaddition or polyaddition of cyclic monomers in which the ring is formed by at least 3 atoms.

20 Claims, No Drawings

OTHER PUBLICATIONS

He, H.-Y. et al., "Surface perfluorofunctionalization of polystyrene and styrene-butadiene- styrene block copolymer by perfluorodiacyl peroxides", Journal of Fluorine Chemistry, 2000, vol. 106(2), p. 117-120, Elsevier Science S.A.

Hayakawa, Y. et al., "Trifluoromethylation by bis(trifluoroacetyl) peroxide of polymers bearing benzene rings", Polymer, 2001, vol. 42(9), p. 4081-4086, Elsevier Science Ltd.

He, H.-Y. et al., "Radical addition reaction between perfluoro- and Ω-H-perfluorodiacyl peroxides and C60 synthesis of perfluoro- Ω-H-perfluoroalkylated C60" (lang.: Chinese), Huaxue Xuebao, 2003, vol. 61(5), p. 736-741, CAS 139:214202.

Sawada, H. et al., "Reactions of fluoroalkanoyl peroxides with single-walled carbon nanotubes: application to sidewall modification of single-walled carbon nanotubes with the introduction of fluoroalkyl groups", Polymers for Advanced Technologies, 2005, vol. 16(11-12), p. 764-769, John Wiley & Sons, Inc.

* cited by examiner

AROMATIC HYDROGENATED POLYMERS CONTAINING FLUORINE

CROSS-REFERENCE TO RELATED APPLICATIONS

This application is a U.S. national stage application under 35 U.S.C. §371 of International Application No. PCT/EP2008/059306 filed Jul. 16, 2008, which claims priority to European Patent Application No. 07425442.6 filed July 18 filed July, 2007, these applications being incorporated herein by reference in their entirety for all purposes.

The present invention relates to hydrogenated polymers containing aromatic rings partially substituted with perfluoropolyether chains attached via heat-stable and non-hydrolyzable bonds, and to the process for preparing them.

More particularly, the invention relates to thermoprocessable or thermosetting aromatic hydrogenated polymers comprising perfluoropolyether chains, which have improved stability to high temperatures and also to oxidizing media, improved chemical resistance, in particular to hydrolysis, even at temperatures up to about 100° C., in combination with good oil-repellency and water-repellency properties.

It is known in the prior art that the presence of aromatic rings in hydrogenated polymers makes it possible to improve certain characteristics such as the mechanical properties, for example the tensile strength, hardness, maintenance of the properties at high temperatures, for example the dimensional stability and also the thermo-oxidative stability. Technical polymers such as, for example, polyether sulfones (PES), polyamides and polyesters belong to this category.

Thermoplastic technical polymers find a multitude of uses in various sectors, for example as components for mechanical parts, membranes, power station components, structural parts for vehicles or aircraft, and in the motor vehicle and transport industry, the electrical and electronics industry and the chemical industry in general. Generally, technical polymers are used in applications in which very high stability to high temperatures, often greater than 250° C. and even greater than 300° C., is required.

The use of fluorinated products for imparting water/oil repellency to polymer materials or for improving the surface properties of non-fluorinated polymer materials is also known in the art. These fluorinated materials may be:
  additives based on fluorinated molecules or polymers that are incorporated into the hydrogenated polymers via non-reactive mixing;
  reactive fluorinated molecules or polymers that are used as reagents for preparing polymer materials via polycondensation or polyaddition reaction to introduce into the non-fluorinated hydrogenated polymer fluorinated segments chemically bonded to the polymer structure.

In the case of thermoplastic resins, among the fluorinated products used in the mixing, mention may be made of monofunctional (per)fluoroalkyls, for instance amides, diamides, triazines and substituted ureas (see, for example, U.S. Pat. No. 3,899,563) or perfluoropolyether-based fluorinated compounds in oil, grease or gum form (see, for example, U.S. Pat. No. 5,143,963 and U.S. Pat. No. 5,286,773). However, the use of fluorinated products to be mixed with non-fluorinated (hydrogenated) polymer materials is disadvantageous since the procedure for introducing the fluorinated additive is a complicated step that requires special apparatus. See the account given in U.S. Pat. No. 6,683,128, which describes the need to use twin-screw extruders with high mixing efficiency in order to obtain good distribution of the additive in the polymer. A further drawback is that these fluorinated products are not chemically bonded to the hydrogenated polymer and, in addition, they are generally poorly compatible or totally incompatible therewith. For this reason, they may be released over time during the use of the manufactured product, causing migration of the fluorinated product into the external environment, which therefore does not ensure the durability of the performance qualities over time. This is particularly hazardous when the use of the polymer involves contact with physiological fluids, for example in biomedical applications.

Perfluoropolyether polymers capable of reacting with aromatic hydrogenated polymers via polycondensation or polyaddition reactions belong to the second category of reactive fluorinated molecules or polymers. The polymers obtained are aromatic polymers such as, for example, polyesters containing perfluoropolyether chains. See, for example, U.S. Pat. No. 5,109,103 in the name of the Applicant, and the publication by M. Levi et al. J. Polym. Sci. Part A: Polym. Chem. 36, 939-947, 1998.

Other examples of aromatic hydrogenated polymers containing fluorinated segments are thermoplastic or thermosetting polyurethanes containing perfluoropolyether (PFPE) chains. See, for example, the articles by C. Tonelli et al. J. Appl. Polym. Sci. 59, 311-327 (1996), C. Tonelli et al. J. Appl. Polym. Sci. 87, 2279-2294 (2003) and U.S. Pat. No. 5,332,798 in the name of the Applicant.

Other examples of hydrogenated aromatic polymers containing PFPE chains are elastomeric polyamides and polyimides. See, for example, U.S. Pat. No. 3,876,617 and U.S. Pat. No. 5,508,380 in the name of the Applicant and the articles E. Strepparola et al., Ind. Eng. Chem. Prod. Res. Dev. 23, No 4, 600-605, 1984, G. Caporiccio et al., Makromol. Chem. 184, 935-947, 1983.

The aromatic hydrogenated polymers containing PFPE of the second category described above have the advantage, with respect to hydrogenated polymers mixed with fluorinated molecules or polymers of the first category, of ensuring maintenance over time of the performance qualities, for example oil- and water-repellency, since the PFPE fluorinated chain is chemically bonded to the polymer structure. However, they have the drawback of being obtained in numerous synthesis phases. In point of fact, a PFPE macromer that has functional groups suitable for the subsequent polymerization reaction with appropriate hydrogenated reagents needs to be synthesized. In addition, these polymers also have another drawback: when they are subjected to particularly harsh application conditions, generally to high temperatures, they undergo adverse degradation reactions towards which they show relatively poor heat resistance. This has a detrimental effect on both the surface and bulk properties. In addition, these polymers show relatively poor resistance to hydrolysis. In particular, when the bonds between the fluorinated part and the hydrogenated part are of the ester, urethane, amide, carbonate or acrylate type, the polymers undergo during their use, in particular at high temperatures and in the presence of moisture, adverse degradation phenomena with a marked decrease in the properties of the polymer or of the manufactured product.

The lack of stability to high temperatures is particularly disadvantageous since the synthesis of the hydrogenated polymer containing perfluoropolyether chains or the preparation of the final manufactured product are generally performed at high temperatures. In point of fact, hydrogenated polymers containing aromatic rings have glass transition temperatures (Tg) and/or melting points (Tm) that are very high, always greater than 200° C., even greater than 250° C. and in certain cases greater than 300° C. For example, polyphenyl sulfone has such a high Tg that the polymer decomposes at 500° C. without softening. In the case of PEK, the melting point is 340° C. Thus, the introduction of fluorinated chains, in particular chains of PFPE structure, into these hydrogenated polymers is usually impossible because of the high processing temperatures required for the mixing or the reaction of the fluorinated molecule or polymer. It should also be noted that even if it were possible to introduce the reactive fluorinated product into the hydrogenated polymer by mixing or reaction at low temperatures, thus avoiding degradation, the final polymer/manufactured product would, however, undergo degradation reactions during its use at high working temperatures, possibly in the presence of an oxidizing medium, for example air, or of a hydrolyzing medium (moisture).

U.S. Pat. No. 5,326,823 describes the grafting reaction of fluorinated peroxides with polymers obtained from monomers bearing terminal olefinic double bonds according to reaction mechanisms known in the art for the grafting reaction onto polyolefinic polymers. The grafting reaction onto polypropylene is reported in the examples. It should be noted that the grafting of these polyolefins takes place on the tertiary carbon of the chain or on the residual olefinic double bonds, or even on double bonds and carbon radicals formed by beta-scission reaction of the polyolefinic polymer chain. See, for example, the account given in "Radical reaction on polypropylene in the solid state", Progress in Polymer Science, Vol. 27, issues 7 Sep. 2002, page 1195-1282; and in "Improving the properties of polymer blends by reactive compounding", Douwe Jurjen van der Wal, chapter 8, pages 161-187, Dissertation of University of Groningen.

There thus appeared to be a need for aromatic hydrogenated polymers that have the following combination of properties:
  improved heat resistance, even in oxidizing medium,
  improved resistance to hydrolysis, even at high temperatures, for example even up to 100° C.,
  absence of release of degradation products containing fluorinated chains,
  good mechanical properties.

The Applicant has found, surprisingly and unexpectedly, that it is possible to solve the technical problem indicated above.

One object of the present invention is aromatic hydrogenated polymers comprising perfluoropolyether (PFPE) chains bonded to the aromatic rings forming sequences that are randomly distributed in the polymer structure, having the formula (I):

$$(T_1\text{-}CF_2O\text{—}Rf\text{—}CF_2)_n\text{-}T_3 \quad (I)$$

in which:
n is an integer from 1 to 10, preferably from 1 to 5 and more preferably chosen between 1, 2 and 3,
$T_1$ has the following meanings:
  optionally substituted aromatic group,
  several optionally substituted condensed aromatic groups,
$T_1$ being an aromatic ring of the backbone of the hydrogenated polymer; $T_3$ may be equal to $T_1$, or alternatively a functional group —COON or —COF, Rf is a (per)fluoropolyoxyalkylene chain,
in which the starting hydrogenated aromatic polymers are obtained by polycondensation, stepwise polyaddition, polyaddition of cyclic monomers in which the ring is formed from at least 3 atoms.

Among the polymers obtained by polycondensation, examples that may be mentioned include polyesters, polyamides, polyimides, polyamide-imides, polycarbonates, polyphenyl sulfides, polyoxyphenylenes, polyether sulfones, polyketones, polyether ketones, polyether ether ketones, and polyarylamides.

Among the polymers obtained by stepwise polyaddition, mention may be made of polyurethanes.

Among the polymers obtained by polyaddition of cyclic monomers in which the ring is formed from at least 3 atoms, mention may be made of polyethers obtained from epoxide or oxetane monomers, polysulfides obtained from thioepoxides, and polyethers or polyamides obtained from lactones or lactams, respectively.

The aromatic hydrogenated polymers may be thermoplastic or thermosetting. In the case of thermoplastic polymers, the fluorinated sequences of formula (I) must be such as to maintain the thermoplastic nature of the hydrogenated polymer used so as to be able to use the techniques of thermoplastic polymers for their processing.

In general, by working with a molar ratio between the peroxide groups of the perfluoropolyether and the aromatic rings of the hydrogenated polymer equal to or less than 1 and preferably less than 0.5, the final polymer maintains the thermoplastic nature of the starting aromatic hydrogenated polymer. Specifically, if a higher molar ratio is used, crosslinked polymers may be obtained, which are no longer processable via the thermoprocessable technique. A person skilled in the art is capable of determining the maximum amount of peroxide that can be reacted with the hydrogenated polymer to obtain a final polymer that maintains the thermoplastic characteristics of the starting hydrogenated aromatic polymer.

In general, in the thermoplastic polymers, n ranges from 1 to 3 and preferably from 1 to 2.

Specifically, in the case where the sequences are too numerous, a crosslinked polymer is obtained, which can no longer be processed via the typical techniques of thermoplastic polymers.

In the case of thermosetting polymers, the sequences may also be present in large amount, even greater than 10, since thermosetting polymers, once obtained, can no longer be thermoprocessed or thermoformed.

The polymers of the present invention may contain sequences of formula (I) in which n may also take various values.

In particular, when n=1 and $T_3$=aromatic, the following sequence is obtained:
  Pol.Ar-PFPE-Pol.Ar
in which Pol.Ar indicates the polymer chain of the hydrogenated polymer containing aromatic groups and Pol indicates that the aromatic group may belong to the same polymer chain or to different polymer chains; and in which the two Pol.Ar groups are on the same polymer chain (backbone), or alternatively the two Ar groups are on two different polymer chains (intercatenary PFPE).

When n=1 and $T_3$=COOH or COF, the following sequence is obtained:
  Pol.Ar-PFPE-COOH or Pol.Ar-PFPE-COF When n=2 and $T_3$=aromatic, the following sequence is obtained:
  Pol.Ar-PFPE-Pol.Ar-PFPE-Pol.Ar
in which the 3 Pol.Ar groups may be on the same polymer chain (intracatenary PFPE) or on two or three different polymer chains (intercatenary PFPE).

When n=2 and $T_3$=COOH or COF, the following sequence is obtained:
  Pol.Ar-PFPE-Pol.Ar-PFPE-COOH or Pol.Ar-PFPE-Pol.Ar-PFPE-COF
in which the Pol.Ar groups may belong to the same polymer chain or to two different polymer chains.

The chain Rf generally has a number-average molecular weight of between 500 and 10,000 and preferably between 800 and 5,000.

Preferably, Rf is a (per)fluoropolyoxyalkylene chain constituted by one or more repeating units, randomly distributed in the chain, having the following structure (CFXO), ($CF_2CF_2O$), ($CF_2CF_2CF_2CF_2O$), ($CR_5R_6CF_2CF_2O$), ($C_3F_6O$), in which ($C_3F_6O$) represents the unit of formula: —($CF_2CF(CF_3)O$)— or —($CF(CF_3)CF_2O$)—, or alternatively ($CF_2CF_2CF_2O$), X=F, $CF_3$; $R_5$ and $R_6$, which may be identical or different, are chosen from H, Cl and perfluoroalkyl containing from 1 to 4 carbon atoms.

The preferred perfluoropolyether chain Rf is chosen from the following structures:

(A) —$(CF_2CF(CF_3)O)_a(CFXO)_b$— or —$CF_2CF(CF_3)O)_a(CFXO)_b$—$CF_2(R''f)CF_2$—O—$(CF_2CF(CF_3)O)_a(CFXO)_b$— in which R"f is a fluoroalkenyl group containing from 1 to 4 carbon atoms; X is as defined above; a and b are integers such that the number-average molecular weight is within the range indicated above; a/b is between 10 and 100;

(B) —$(CF_2CF_2O)_c(CF_2O)_d(CF_2(CF_2)_zO)_h$— in which c, d and h are integers such that the number-average molecular weight is within the range indicated above; c/d is between 0.1 and 10; h/(c+d) is between 0 and 0.05, z is 2 or 3; h also possibly being equal to zero;

(C) —$(C_3F_6O)_e(CF_2CF_2O)_f(CFXO)_g$— in which X is as defined above; e, f and g are integers such that the number-average molecular weight is within the range indicated above; e/(f+g) is between 0.1 and 10; f/g is between 2 and 10;

(D) —$(CF_2(CF_2)_zO)_s$— in which s is an integer such as to give the molecular weight indicated above; z has the meaning defined above;

(E) —$(CR_5R_6CF_2CF_2O)_{j'}$— or —$(CR_5R_6CF_2CF_2O)_{p'}$—R"f-O$(CR_5R_6CF_2CF_2O)_{q'}$— in which $R_5$ and $R_6$ are identical or different and chosen from H, Cl and perfluoroalkyl containing from 1 to 4 C atoms; R"f is a fluoroalkenyl group containing from 1 to 4 C atoms; j', p' and q' are integers such as to have a molecular weight as indicated above;

(F) —$(CF(CF_3)CF_2O)_{j''}$— j" being an integer such as to have the molecular weight indicated above.

Particularly preferred structures are (A) and (B).

In one preferred embodiment, the polymers of the present invention are characterized by the absence of residual olefinic double bonds, by the absence of tertiary carbon atoms and the by the fact that they are derived from monomers lacking tertiary carbon atoms and terminal olefinic double bonds.

The characteristics described above may be revealed in the starting aromatic hydrogenated polymer by means of $^1$H NMR analysis.

In the polymers of the present invention, the aromatic rings are directly bonded to the perfluoropolyether chain via a —C—C— bond. See the NMR analysis given in the examples.

The Applicant has found, surprisingly and unexpectedly, that the polymers of the present invention show improved heat stability, even at very high temperatures, even up to 300° C. as a function of the starting aromatic hydrogenated polymer, even in oxidizing environment, and improved chemical resistance, in particular to hydrolysis, even at temperatures of about 100° C., compared with the polymers of the prior art described above containing fluorine.

In addition, the polymers of the present invention have improved surface properties, such as water/oil repellency (measured by means of the contact angles) relative to aromatic hydrogenated polymers, while at the same time maintaining unchanged the bulk properties, for example the mechanical properties, of the hydrogenated aromatic polymer. In addition, the polymers of the present invention do not show any phenomenon of release of fluorinated compounds (see the examples). This is an essential requirement in order for the polymers of the invention to maintain the same properties over time.

The polymers of the invention may be used in applications in which the working conditions are particularly harsh, even at high temperatures and possibly also in the presence of water.

When compared with hydrogenated polymers mixed with perfluoropolyether fluorinated compounds or compared with polymers containing perfluoropolyether chains obtained by polycondensation or polyaddition, the polymers of the invention have noteworthy advantages in that they show good surface properties typical of fluorinated polymers combined with higher heat and hydrolytic stability.

The Applicant has found, surprisingly and unexpectedly, that the polymers of the present invention may be obtained via a simple process that involves a single reaction step.

A further object of the present invention is a process for preparing aromatic hydrogenated polymers containing the sequences of formula (I), comprising the reaction of a hydrogenated polymer containing optionally substituted aromatic groups with a fluorinated peroxide that generates carbon radicals and that has an oxidizing power (OP), defined as grams of active oxygen per 100 grams of peroxide, of less than 4% and preferably less than 3%, by working with a molar ratio between the peroxide groups of the fluorinated peroxide and the aromatic rings of the hydrogenated polymer of less than or equal to 1 and preferably less than 0.5, in which the starting hydrogenated aromatic polymers are obtained by polycondensation, stepwise polyaddition or polyaddition of cyclic monomers in which the ring is formed by at least 3 atoms.

The starting aromatic hydrogenated polymers are non-olefinic polymers and are derived from monomers free of terminal olefinic double bonds and of tertiary carbon atoms.

As fluorinated peroxide that generates carbon radicals, mention may be made of alkanoyl peroxides, for instance perfluorooctanoyl peroxide, perfluorononanoyl peroxide or perfluorobutanoyl peroxide. Perfluoropolyethers ending with alkanoyl peroxide groups or containing the said groups either in the polymer chain or pendent on the chain may also be used.

It has been found, unexpectedly, that perfluoropolyether peroxides with an oxidizing power (OP), defined as grams of active oxygen per 100 grams of perfluoropolyether peroxides and belonging to the category of alkyl peroxides, may also be used as carbon-radical generators. It is observed that the latter category of peroxides does not contain alkanoyl peroxide groups. This latter category of peroxides is the preferred category in the present invention.

The process of the invention is described in detail with reference to perfluoropolyether peroxides.

The molar ratio between the peroxide groups of the perfluoropolyether and the aromatic rings of the hydrogenated polymer may also be about 0.0001.

The perfluoropolyether peroxide may be dissolved in a solvent that is inert under the reaction conditions.

Generally, the amount of perfluoropolyether peroxide used relative to the polymer is between 0.1% and 50%, preferably between 0.5% and 10% and more preferably between 1% and 5% by weight.

The perfluoropolyether peroxide used in the process of the present invention contains one or more of the following repeating units, randomly distributed in the chain, having the following structure (CFXO), ($CF_2CF_2O$), ($CF_2CF_2CF_2O$), ($CF_2CF_2CF_2CF_2O$), ($CR_5R_6CF_2CF_2O$), ($C_3F_6O$), which may be of the formula: —($CF_2CF(CF_3)O$)— or —($CF(CF_3)CF_2O$)—, or alternatively ($CF_2CF_2CF_2O$), X=F, $CF_3$; $R_5$ and $R_6$, which may be identical or different, are chosen from H, Cl and perfluoroalkyl containing from 1 to 4 carbon atoms.

Preferably, the peroxide has the following structure:

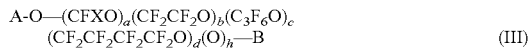
(III)

in which

A and B, which may be identical or different, are chosen from —$CF_2COF$, $CF_2CF_2COF$, $CF_2CF_2CF_2COF$, —$CF_2C(O)CF_3$, —COF;

—$CF_3$, —$CF_2CF_3$, —$C_3F_7$, it being possible for a fluorine atom to be optionally replaced with a chlorine or hydrogen atom;

the indices a, b, c, d and h are integers, including zero, such that the number-average molecular weight of the peroxide (III) is between 300 and 150,000, and the index h is a non-zero integer so as to give a content of peroxide bridges —O—O— or an oxidizing power (OP), as defined above, of between 0.02% and 4%, preferably between 0.2% and 4.0% and more preferably between 0.5% and 3%.

Preferably, the perfluoropolyether peroxides are chosen from the following categories:

(1) Xo-O($CF_2CF_2O$)$_r$($CF_2O$)$_s$(O)$_t$—Xo' in which

Xo and Xo', which may be identical or different, are —$CF_2Cl$, —$CF_2CF_2Cl$, —$CF_3$, —$CF_2CF_3$, —$CF_2COF$, —COF;

r, s and t are integers such that the number-average molecular weight is as defined above, preferably between 500 and 100,000; r/s is between 0.1 and 10, s being non-zero; t is an integer such that the OP is within the range defined above.

These perfluoropolyether peroxides may be prepared by oxypolymerization of tetrafluoroethylene according to the teaching of U.S. Pat. No. 3,715,378, U.S. Pat. No. 4,451,646, U.S. Pat. No. 5,258,110 and U.S. Pat. No. 5,744,651 and patent applications EP 1 702 940 and EP 1 702 939.

(2) X1-O($CF_2CF_2O$)$_r$($CF_2O$)$_s$($CF(CF_3)O$)$_u$($CF_2CF(CF_3)O$)$_v$(O)$_t$—X1' in which

X1 and X1' are identical or different and are —$CF_2Cl$, —$CF_2CF_2Cl$, —$CF_2CF_3$, —$CF_3$, —$C_3F_7$, —$CF(CF_3)$COF, —COF, —$CF_2COF$, —$CF_2C(O)CF_3$;

r, s, t, u and v are integers, including zero, such that the number-average molecular mass is as defined above, preferably between 700 and 80,000; t is a number such that the OP is within the range defined above.

These perfluoropolyether peroxides may be prepared by oxypolymerization of tetrafluoroethylene and perfluoropropylene according to the teaching of U.S. Pat. No. 5,000,830.

(3) X2-O($CF_2CF_2O$)$_r$($CF_2O$)$_s$($CF_2(CF_2)_wCF_2O$)$_k$(O)$_t$—X2' in which

X2 and X2', which may be identical or different, are —$CF_2COF$, —COF, w=1 or 2, r, s, t and k are integers such that the number-average molecular weight is between 700 and 100,000 and preferably between 700 and 80,000; r/s is between 0.2 and 10, k/(r+s) is less than 0.05 and t is an integer such that OP is as defined above.

These perfluoropolyether peroxides may be prepared according to the teaching of patent US 2005/192 413.

The temperature used in the process of the present invention is generally between 20° C. and 300° C., optionally in the presence of UV. When the temperature is below 150° C., the reaction is preferably performed in the presence of UV radiation. When the reaction is purely heat-assisted, the preferred temperature range is 150-300° C. and more preferably between 180° C. and 250° C.

The reaction is generally complete within a time of between 10 minutes and 10 hours, depending on the reaction temperature.

The reaction may be performed in bulk, or in the presence of suitable solvents, provided that they are inert under the reaction conditions. Solvents that may be mentioned include CFC, FC, HCFC, preferably HFC; (per)fluoropolyethers, optionally containing hydrogen atoms, such as H-Galden® and HFE®.

One means for inserting the fluorinated sequences into the aromatic hydrogenated polymers is to treat the hydrogenated polymer in powder or pellet form with the peroxide, the latter preferably being dissolved in a solvent. The solvent may then be moved, and the mixture is brought to the reaction temperature and/or photoactivation is initiated. At the end, the polymer may be recovered, optionally by removing the solvent, if present.

Another means for inserting the fluorinated sequences into the aromatic hydrogenated polymers is to treat a manufactured product of the hydrogenated polymer with a peroxide, preferably dissolved in the solvent.

Another means for inserting the fluorinated sequences into the aromatic hydrogenated polymers is to treat the hydrogenated polymer in melt form with the peroxide.

The pressure in the process of the invention is generally between atmospheric pressure and 20 atm.

The PFPE peroxide may be prepared, for example, via photo-assisted polymerization of tetrafluoroethylene and/or hexafluoropropene, which may also be mixed together, in the presence of oxygen as described, for example, in U.S. Pat. No. 3,442,942; U.S. Pat. No. 3,650,928; U.S. Pat. No. 3,665,041.

The hydrogenated aromatic polymers may be thermoprocessable or thermosetting. Examples of thermoprocessable materials are polyethersulfones (PES), polyphenyl sulfides (PPS), polyimides (PI), polyphenylene oxides (PPO), polyketones, polyether ketones (PEK), polyether ether ketones (PEEK), polyesters, polyamides, polyurethanes and polyarylamides.

Polyether sulfones (PES), polyphenyl sulfides (PPS), polyimides (PI), polyphenylene oxides (PPO), polyketones, polyether ketones (PEK), polyether ether ketones (PEEK), polyesters, polyamides, polyurethanes and polyarylamides are particularly preferred.

Examples of thermosetting polymers are epoxy polymers, polyurethanes, polyesters, etc.

In all cases, independently of the selected procedure and of the chemical structure of the starting hydrogenated polymer, the process involves complete conversion of the peroxide.

The process of the present invention has the advantage of allowing the introduction of fluorinated sequences into hydrogenated aromatic polymers in a single step, in a manner that is simple and applicable in general to all polymers containing aromatic rings. It is also observed that the perfluoropolyether peroxide used in the process of the invention may be obtained via an industrial process in high yield.

The process has the advantage of being extremely flexible: specifically, as stated, the PFPE compound may be introduced onto the hydrogenated polymer in melt form, or alternatively dissolved in a solvent or a mixture of solvents, not only onto the same solid polymer in the form of powder and/or pellets, but also onto the finished manufactured product. In addition, the process is applicable to any hydrogenated polymer containing aromatic rings. Thus, the process of the present invention may be implemented very readily, even on an industrial scale.

It has been found, surprisingly and unexpectedly, that the reaction between the peroxide compounds of formula (II) and the aromatic groups of the hydrogenated polymer leads to Rf—$CF_2$-Aromatic bonds bonded via a —C—C— bond. See the NMR analysis in the examples. In the analysis, formation of an ether bond is not observed under the process conditions.

This is surprising and unexpected since the peroxides of formula (II) are known to be generators of oxygen radicals of perfluorooxyalkyl(alkoxy radical) type. The PFPE peroxides of the present invention, which are oxygen-radical generators, behave, unexpectedly, in the process of the present invention like carbon-radical generators.

As stated, the hydrogenated polymers containing aromatic rings bonded to PFPE chains that may be obtained via the process of the present invention show the combination of properties indicated above, such as improved heat resistance, even in oxidizing medium, improved resistance to hydrolysis, even at high temperatures, for example up to 100° C., absence of release of degradation products containing fluorinated chains, good surface properties, for instance water/oil repellency, and their substantial maintenance over time, and good mechanical properties.

It was subsequently found that the polymers of the present invention also show water/oil repellency properties that remain substantially unchanged over time.

The polymers of the present invention may be used for preparing manufactured products having high performance qualities, for instance components for mechanical parts, membranes, components for power stations, structural parts for vehicles or aircraft, in the motor vehicle and transport industry, the electrical and electronics industry and the chemical industry, in general.

The polymers of the present invention, when $T_3$ of the fluorinated sequences (I) is COOH or COF, may be subsequently transformed by converting, as stated, the functional groups $T_3$ into various other functional groups to obtain functionalized aromatic hydrogenated polymers. These transformations are performed according to techniques known in the art, for example via amidation, reduction, nucleophilic substitution or condensation reactions. See, for example, U.S. Pat. No. 6,127,498.

When, in formula (I), $T_3$=COOH or —COF, these groups may be transformed into other functional groups in which $T_3$ is transformed into -$A_q$-$(T_2)_p$ to give sequences of formula:

in which:

n and $T_1$ are as defined above,

A is a divalent radical between the perfluoropolyether chain and the functional group $T_2$, q=0 or 1, p is an integer between 1 and 4 and preferably between 1 and 2, $T_2$ is a reactive functional group other than —COF or —COOH and is obtained therefrom according to techniques known in the art; $T_2$ may optionally contain heteroatoms, for example oxygen, sulfur or nitrogen; the said functional group possibly being, for example, COOR (in which R=$C_1$-$C_{20}$ alkyl or aryl, optionally substituted), COOM in which M=alkali metal or alkaline-earth metal cation or alternatively —NH($R_1R_2R_3$)$^+$ in which $R_1$, $R_2$ and $R_3$, which may be identical or different, are chosen from H, $C_1$-$C_{20}$ alkyl; CONHR (in which R=$C_1$-$C_{20}$ alkyl or aryl, optionally substituted), CONR$_1$R$_2$ in which $R_1$ and $R_2$, which may be identical or different, are $C_1$-$C_{20}$ alkyl, nitrile, —$CH_2$OH, —$R_3$OH (in which $R_3$=$C_1$-$C_{20}$ alkylene residue optionally containing one or more oxygen atoms), $T_2$ possibly also containing allyl, epoxide or alkoxysilane groups.

Preferably, A is a group of linear aliphatic type of the type —$(CH_2)_{m'}$— in which m' is an integer from 1 to 20, or alternatively (alkylene)cycloaliphatic or (alkylene)aromatic, A may optionally contain heteroatoms in the ring or in the alkylene chain, and may be a linear or branched polyalkyleneoxy chain, in particular containing a repeating unit of the type $CH_2CH_2O$, $CH_2CH(CH_3)O$, $(CH_2)_3O$, $(CH_2)_4O$. The linking bridge A may also contain groups of the amide, ester, ether or COO type, or of the sulfide or imine type. The number of carbon atoms in the cycloaliphatic compounds is from 3 to 20, and is from 5 to 20 for the aromatic groups; the group A may also be a species of the types indicated. The group for the bonding of A to the perfluoromethylene group of the fluorinated chain may be, for example: —C—, —O—, —CONR— (R is H, alkyl, cycloaliphatic or aromatic groups containing less than 15 carbon atoms), —$CO_2$—, —COS—, —CO—, a heteroatom, or alternatively triazine groups, or 5- or 6-atom aromatic heterocycles containing 2 or more identical or different heteroatoms.

In particular, $T_2$ may be, for example: —OH, —SH, —SR', —NR'$_2$, —COON, —SiR'$_d$Q$_{3-d}$, —CN, —NCO, CH=$CH_2$,

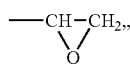

—COR', —OSO$_2$CF$_3$, —OCOCl, —OCN, —N(R')CN, —(O)COC(O)—, —I, —CHO, —CO, —CH(OCH$_3$)$_2$, —SO$_2$Cl, —C(OCH$_3$)=NH, —C(NH$_2$)=NH, —CH(OH)CH$_2$OH, —CH(COOH)$_2$, —CH(COOR')$_2$, —CH(CH$_2$OH)$_2$, —CH(CH$_2$NH$_2$)$_2$, —CH(CN)$_2$, —CH(CH$_2$OCH$_2$CH=CH$_2$)$_2$, in which R' is an alkyl, cycloaliphatic or aromatic group, R' optionally containing fluorine, Q is an OR' group, and d is an integer between 0 and 3.

The compounds of formula (II) are prepared, for example, from acids, esters or acyl halides of the poly(perfluoroalkylene oxides) via known reactions, for example as indicated in Table I.

| A-T$_2$ of formula (I) | Reagent |
|---|---|
| 1  —CONHCH$_2$—CH=CH$_2$ | H$_2$NCH$_2$—CH=CH$_2$ |
| 2  —CONH(CH$_2$)$_3$CO$_2$H | H$_2$N(CH$_2$)$_3$CO$_2$H |
| 3  —CON(CH$_3$)CH$_2$CH$_2$OH | HN(CH$_3$)CH$_2$CH$_2$OH |
| 4  —CONHCH$_2$CH$_2$NH$_2$ | H$_2$NCH$_2$CH$_2$NH$_2$ |
| 5  —CONHCH$_2$CH$_2$SH | H$_2$NCH$_2$CH$_2$SH |
| 6  —CONH(CH$_2$)$_3$Si(OCH$_3$)$_3$ | H$_2$N(CH$_2$)$_3$Si(OCH$_3$)$_3$ |
| 7  —CONH–C$_6$H$_4$–OH (meta-hydroxyanilide) | meta-H$_2$N–C$_6$H$_4$–OH |
| 8  —CONH–C$_6$H$_4$–CH$_2$CO$_2$H (para) | H$_2$N–C$_6$H$_4$–CH$_2$CO$_2$H (para) |
| 9  —CONH–C$_6$H$_3$(OH)$_2$ (2,5-dihydroxyanilide) | H$_2$N–C$_6$H$_3$(OH)$_2$ |
| 10 —CONH–C$_6$H$_4$–Si(CH$_2$)$_2$OC$_2$H$_5$ | H$_2$N–C$_6$H$_4$–Si(CH$_2$)$_2$OC$_2$H$_5$ |
| 11 —CONH–C$_6$H$_4$–CH$_2$CH=CH$_2$ | H$_2$N–C$_6$H$_4$–CH$_2$CH=CH$_2$ |
| 12 —CONH–C$_6$H$_3$(NCO)(CH$_3$) | OCN–C$_6$H$_3$(NCO)(CH$_3$) |
| 13 —CONH–C$_6$H$_4$–O–C$_6$H$_4$–NCO | OCN–C$_6$H$_4$–O–C$_6$H$_4$–NCO |
| 14 —CONH–C$_6$H$_{10}$–CH$_2$–C$_6$H$_{10}$–NCO | OCN–C$_6$H$_{10}$–CH$_2$–C$_6$H$_{10}$–NCO |
| 15 2-methyl-5-hydroxybenzoxazole | (1) 2-amino-hydroquinone (H$_2$N–C$_6$H$_3$(OH)$_2$) <br> (2) Heating |
| 16 2-methyl-5-(3,4-diaminophenyl)benzimidazole | (1) 3,3',4,4'-tetraaminobiphenyl <br> (2) Heating |

-continued

| A-T$_2$ of formula (I) | Reagent |
|---|---|
| 17 ![2-methylbenzothiazole-6-carboxylic acid structure] —CO$_2$H | (1) H$_2$N-C$_6$H$_3$(SH)-CO$_2$H (4-amino-3-mercaptobenzoic acid)<br>(2) Heating |
| 18 [oxadiazole structure with =CH$_2$ and CH$_3$ substituents] | (1) H$_2$NNHCOC(CH$_3$)=CH$_2$<br>(2) Dehydration |
| 19 —CO$_2$CH$_2$C(CH$_3$)$_2$CH$_2$OH | HOCH$_2$C(CH$_3$)$_2$CH$_2$OH |
| 20 —CO$_2$CH$_2$CH(OH)CH$_3$ | CH$_3$CH—CH$_2$ (epoxide) \\ \\O |
| 21 —CO$_2$CH$_2$CH=CH$_2$ | CH$_2$=CHCH$_2$OH |
| 22 —CN | (1) NH$_3$<br>(2) Dehydration |
| 23 [triazine structure with CH=CH$_2$ and CF$_3$ substituents] | (1) NH$_3$<br>(2) Dehydration<br>(3) H$_2$N—C(=NH)—CF$_3$<br>(4) (CH$_2$=CHCO)$_2$O |
| 24 —CH$_2$OH | LiAlH$_4$ |
| 25 —CH$_2$OCH$_2$CH(OH)CH$_2$OH | Compound 24 + CH$_2$—CHCH$_2$OH (epoxide) |
| 26 —CH$_2$OCH$_2$CH—CH$_2$ (epoxide) | Compound 24 + epibromohydrin |
| 27 —CH$_2$OCH$_2$CH=CH | Compound 24 + CH$_2$=CHCH$_2$Br |
| 28 —CH$_2$OCO—C$_6$H$_4$—NH$_2$ | Compound 24 + [2,4-dioxo-1,2,3,4-tetrahydroquinoline structure] |
| 29 —CH$_2$OSO$_2$CF$_3$ | Compound 24 + CF$_3$SO$_2$F + (C$_2$H$_5$)$_3$N |
| 30 —CH$_2$OCN | Compound 24 + NCCl + (C$_2$H$_5$)$_3$N |
| 31 —CH$_2$O—C$_6$H$_4$—NH$_2$ | (1) Compound 29 + NaO—C$_6$H$_4$—NO$_2$<br>(2) H$_2$ |
| 32 —CH$_2$O—C$_5$H$_3$N—NCO | Compound 31 + phosgene |
| 33 —CH$_2$O—[phthalic anhydride structure] | (1) Compound 29 + NaO—C$_6$H$_3$(CO$_2$CH$_3$)—CO$_2$CH$_3$<br>(2) Hydrolysis<br>(3) Acetic anhydride |

-continued

| A-T$_2$ of formula (I) | Reagent |
|---|---|
| 34 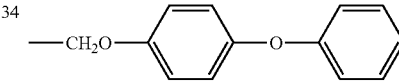 | (1) Compound 29 + NaO-C$_6$H$_4$-O-C$_6$H$_4$-OH 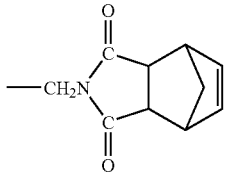<br>(2) ClCN + triethylamine |
| 35 —CH$_2$NH$_2$ | Compound 29 + NH$_3$ |
| 36 —CH$_2$NCO | Compound 35 + COCl$_2$ |
| 37 —CH$_2$NHCH$_3$ | Compound 29 + CH$_3$NH$_2$ |
| 38 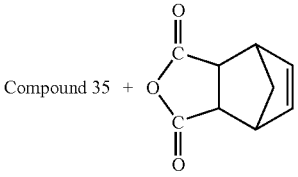 | Compound 35 + 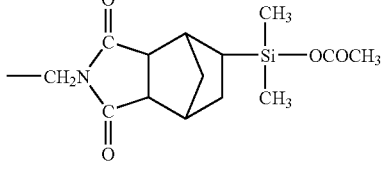 |
| 39 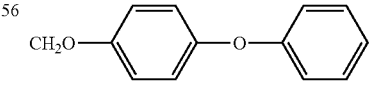 | Compound 38 + HSi(CH$_3$)$_2$OCOCH$_3$ + H$_2$PtCl$_6$ |
| 40 —CH$_2$OCOC(CH$_3$)=CH$_2$ | Compound 24 + CH$_2$=C(CH$_3$)COCl |
| 41 —CH$_2$I | Compound 29 + NaI |
| 42 —CH$_2$SH | (1) Compound 29 + CH$_3$COSNa<br>(2) Hydrolysis |
| 43 —CH$_2$N$^+$≡C$^-$ | (1) Compound 35 + HCO$_2$CH$_3$<br>(2) COCl$_2$ + (C$_2$H$_5$)$_3$N |
| 44 —NCO | (1) NaN$_2$<br>(2) Heating |
| 45 —COC$_6$H$_5$ | Cd(C$_6$H$_5$)$_2$ |
| 46 —C(CH$_3$)$_2$OH | (1) CH$_3$MgBr<br>(2) H$^+$ |
| 47 —CHO | LiAlH$_4$ |
| 48 —C(CH$_3$)=CH$_2$ | Compound 46 + P$_2$O$_5$ |
| 49 —CH$_2$N(CN)CH$_3$ | Compound 37 + ClCN + (C$_2$H$_5$)$_3$N |
| 50 —I | (1) Ag$_2$O<br>(2) I$_2$ |
| 51 —CH=CH$_2$ | Compound 47 + CH$_2$=P(C$_6$H$_5$)$_3$ |
| 52 —C(OCH$_3$)=NH | Compound 22 + CH$_3$OH + (C$_2$H$_5$)$_3$N |
| 53 —CH$_2$—SO$_2$Cl | Compound 42 + Cl$_2$ + H$_2$O |
| 54 —CH(OCH$_3$)$_2$ | Compound 47 + CH$_3$OH + acid |
| 55 —C(NH$_2$)=NH | Compound 22 + NH$_3$ |
| 56 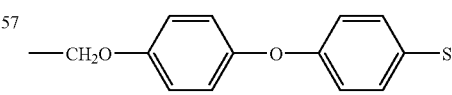 | Compound 29 + NaO-C$_6$H$_4$-O-C$_6$H$_5$ |
| 57 —CH$_2$O-C$_6$H$_4$-O-C$_6$H$_4$-SO$_2$Cl | Compound 55 + ClSO$_3$H |
| 58 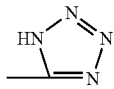 | Compound 22 + NH$_3$ |

The polymers containing the sequences of formula (II) may be used for preparing manufactured products having high performance qualities, for instance components for mechanical parts, membranes, components for power stations, structural parts for vehicles or aircraft, in the motor vehicle and transport industry, the electrical and electronics industry and the chemical industry, in general.

A number of non-limiting examples illustrating the present invention are now given.

EXAMPLES

Test of Heat Stability in Air (Thermo-Oxidative)

The heat stability of the polymers is evaluated by placing a known aliquot of about 5 g of the preselected polymer in the form of powder or of thin film (0.1 mm) to be evaluated, into a glass autoclave, and the temperature is maintained at 300° C. (unless otherwise indicated) for 24 hours. At the end of the test, the autoclave is cooled and optionally depressurized by venting off the low-boiling by-products. An aliquot of product is weighed out and extracted with CFC 113 to dissolve any fluorinated decomposition by-products. The remaining product is dissolved in suitable solvents and analyzed by $^{19}F$ and $^{1}H$ NMR to determine the possible structural changes therein. The decomposition, if any, is expressed as a total percentage (by moles) of decomposed fluorinated product relative to the initial fluorinated product bonded to the polymer chain.

Test of Hydrolytic Stability

The hydrolytic stability of the polymers is evaluated by placing a known aliquot of about 5 g of the preselected polymer in the form of powder or of thin film (0.1 mm) to be evaluated, together with 5 g of water, in a glass autoclave, and the temperature is maintained at 80° C. (unless otherwise indicated) for 240 hours. At the end of the test, the autoclave is cooled and optionally depressurized by venting off the low-boiling by-products. The product dissolved in suitable solvents is analyzed by $^{19}F$ and $^{1}H$ NMR analysis to determine the percentage of hydrolysis, and the aqueous phase is extracted several times with aliquots of CFC-113 to extract out any fluorinated hydrolysis products dissolved/dispersed therein. The degree of hydrolysis is expressed as a total percentage (molar) of hydrolyzed fluorinated product (both in the polymer and present in the aqueous phase) relative to the initial fluorinated product. Unless otherwise indicated, the hydrolysis test is performed at the spontaneous pH, i.e. without the addition of any basic or acidic catalyst.

Test of Static Contact Angles Vs. Water and Hexadecane

The measurements are performed using a sessile drop instrument (Kruss Drop Shape Analysis System DSA 10) in an environment thermostatically maintained at 25° C. on samples 1-mm thick obtained by compression moulding. A liquid of known surface tension is placed on the surface of the samples. The profile of the drop is photographed and the best-fit curve is then calculated, from which the contact angle is determined. The reported values are based on an average of 10-15 measurements performed on at least 3 different samples obtained under the same conditions. The higher the contact angle, the greater the water- or oil-repellency. Angles of greater than 90° are the minimum condition for having repellency (phobicity).

Release Test 5 g of polymer material are dissolved in 50 ml of a 1/9 (w/w) dimethylformamide (DMF)/THF mixture to give a slightly opalescent solution, to which is added CFC-113 until the solution becomes clear. Further CFC-113 is added up to the point of precipitation. The precipitate is separated from the mixture by filtration, and the organic phase is washed with water to remove the DMF. The resulting phase is then treated with sodium sulfate and concentrated by partial distillation of the CFC-113 and of the THF. The concentrated solution is analyzed by $^{19}F$-NMR to reveal any extracted fluorinated products.

Preparation Examples

Example 1

A polyphenylene sulfide having the following mechanical properties is used: tensile strength 160 MPa; elastic modulus 16 GPa; HDT/A (ISO 75)>260° C. 47.5 g of polyphenylene sulfide (Aldrich, molecular weight (Mn) equal to 10,000, Tg=150° C.) in powder form, 50 g of a solution in CFC 113 at 3% by weight of peroxide having the structure $CF_3O(C_2F_4O)_c(CF_2O)_d(O)_{27}$—COF in which c/d=1 and of MW 40,000 and an average number of peroxide groups per chain equal to 27, are placed in a 250 ml glass reactor equipped with a mechanical stirrer, under an inert atmosphere (nitrogen). The mixture is stirred at room temperature. After evaporating off the CFC-113 solvent at 30° C. and under reduced pressure (20 mmHg residual), the temperature is raised to 300° C. and the molten mass is left at this temperature with stirring for 30 minutes. The reaction mass is cooled to room temperature and about 45 g of a product in solid form are recovered, which, when dissolved in a suitable warm aromatic solvent (deuterated dichlorobenzene), shows on $^{1}H$ and $^{19}F$ NMR analysis complete conversion of the peroxide groups and the presence of PFPE segments bonded to the aromatic ring via a —$CF_2$-aromatic group. The $^{19}F$-NMR analysis also reveals the presence of the group —$OCF_2$— in which the $CF_2$ is directly bonded to the aromatic ring by means of the signal at −66/−68 ppm. The analysis compared to the NMR confirms that the aromatic ring contains as sole fluorinated substituent the substituent bonded via the sequence indicated above. The typical signals of $CF_2$—O—Ar sequences are not present. The fluorine elemental analysis indicates a value equal to 1.8 w/w % of fluorine corresponding to 2.9 w/w % of PFPE product present in the hydrogenated polymer structure. This value reveals that about 95% of the initial PFPE peroxide has reacted with the polymer matrix. The mechanical properties of the polymer obtained are substantially similar to those of the starting polymer.

Example 2

47.5 g of polyphenylene sulfide (Aldrich, Tm=285° C., viscosity=275 poises at 310° C.) in powder form, and 50 g of a solution in CFC-113 at 3% by weight of peroxide having the structure $CF_3O(C_2F_4O)_c(CF_2O)_d(O)_{27}$—COF in which c/d=1 and having a number-average molecular weight of 40,000 and an average number of peroxide groups per chain equal to 27 are placed in a 250 ml glass reactor equipped with a mechanical stirrer, under an inert atmosphere (nitrogen). The mixture is stirred for 2 hours at room temperature. After evaporating off the CFC-113 solvent at 30° C. and under reduced pressure, as in Example 1, the temperature is raised to 220° C. and the mixture is left stirring at this temperature for 3 hours.

The reaction mass is cooled to room temperature and about 43 g of a product in powder are recovered. The product, dissolved in a suitable warm aromatic solvent (deuterated dichlorobenzene), shows on $^{1}H$ and $^{19}F$ NMR analysis total conversion of the peroxide groups and the presence of PFPE segments bonded to the aromatic ring via a —$CF_2$-Aromatic bond. The $^{19}$F-NMR analysis also reveals the presence of the group —OCF$_2$— in which the CF$_2$ is directly bonded to the aromatic ring, by means of the signal at −66/−68 ppm. The comparative NMR analysis confirms that the aromatic ring bears as sole fluorinated substituent the substituent bonded via the sequence indicated above. Signals typical of CF$_2$—O—Ar sequences are not present. The fluorine elemental analysis indicates a value equal to 1.7 w/w %, corresponding to 2.8 w/w % of PFPE product present in the hydrogenated polymer structure. This value reveals that about 90% of the initial PFPE peroxide has reacted with the polymer matrix.

Example 3 (Comparative)

47.5 g of polyphenylene sulfide (PPS) of Example 1 and 50 g of a solution of CFC-113 containing 3% of a fluorinated polyamide similar to that described in U.S. Pat. No. 4,278,776, obtained by polycondensation of hexamethylenediamine and ROOC—CF$_2$(OCF$_2$CF$_2$)$_n$(OCF$_2$)$_m$OCF$_2$—COOR m/n=1 with m, n such that the number-average molecular weight is 2,000 and R=C$_2$H$_5$, are placed in the apparatus described previously.

The mixture is left stirring at room temperature. After evaporating off the solvent at 30° C. and under reduced pressure (20 mmHg), the temperature is raised to 200° C. and the molten mass is left stirring for one hour.

The reaction mass is cooled to room temperature and about 47 g of a product in solid form are recovered, and the fluorine elemental analysis shows a value equal to 1.8 w/w % of fluorine, corresponding to 2.9 w/w % of PFPE product present in the polymer structure.

Example 4

80 g of amorphous 70/30 poly(ethylene terephthalate-co-ethylene isophthalate) polyester (terephthalate/isophthalate weight ratio), prepared as described by J. Yu et al. in J. Appl. Polym. Sci., 73, 1191-1195 (1999), are placed in a 250 ml glass reactor equipped with a mechanical stirrer, under an inert atmosphere (nitrogen).

40 g of polymer are taken as a reference blank for the following tests.

45 g of a solution in CFC-113 at 3% by weight of PFPE peroxide having the structure

in which c/d=1 and of PM 40,000 and with an average number of peroxide groups per chain equal to 27, are then placed in the reactor.

The mixture is stirred for 2 hours at room temperature. After evaporating off the CFC-113 solvent at 30° C. and under reduced pressure (20 mmHg residual), the temperature is raised to 120° C. and the mixture is left stirring at this temperature for 2 hours. The hydrogenated polymer melts and a homogeneous viscous mass is obtained, which is maintained at a temperature of 220° C. for 3 hours. The reaction mass is cooled to room temperature and about 43 g of product in the form of a transparent solid are recovered.

The abovementioned product, dissolved in trifluoroacetic acid, reveals on $^1$H and $^{19}$F NMR analysis total conversion of the peroxide groups and shows the presence of PFPE chains bonded to the aromatic ring via a —CF$_2$-Aromatic bond.

$^{19}$F-NMR analysis also reveals the presence of the —OCF$_2$— group in which the CF$_2$ is directly bonded to the aromatic ring, by means of the signal at −66/−68 ppm. The comparative NMR analysis confirms that the aromatic ring bears, as sole fluorinated substituent, the substituent bonded via the sequence indicated above. Signals typical of CF$_2$—O—Ar sequences are not present.

The fluorine elemental analysis indicates a value equal to 1.9 w/w %, corresponding to 3.1 w/w % of PFPE product present in the modified polymer structure.

This value reveals that about 93% of the initial PFPE peroxide has reacted with the polymer matrix.

Example 5 (Comparative)

In accordance with that described in U.S. Pat. No. 5,109,103 in the name of the Applicant, an amorphous polyester containing perfluoropolyether segments is prepared by reacting 48.5 g (0.25 mol) of dimethyl terephthalate, 20.8 g of dimethyl isophthalate (0.11 mol), 50 g (0.81 mol) of ethylene glycol and 3 g of Fluorolink E 10H (PFPE diol) having the structure

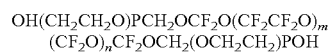

in which p=2, m/n=2 and such that MW=1,600.

80 g of polymer material are obtained, NMR analysis of which confirms the presence of PFPE chains bonded to the polymer structure via ester bonds (the PFPE chain being separated from the carbonyl group by a polyoxyethylene segment).

The fluorine elemental analysis indicates a value equal to 2.1 w/w %, corresponding to 3.8 w/w % of PFPE product present in the modified polymer structure.

This value reveals that about 93% of the initial PFPE peroxide has reacted with the polymer matrix.

Example 6

According to the known teaching of the prior art, an aromatic polyester is prepared by reacting 48.5 g (0.25 mol) of dimethyl terephthalate, 36 g (0.4 mol) of 1,4-butanediol and 100 g of polyoxytetramethylene glycol (MW 1,000, 0.1 mol).

The polymer thus obtained, having a Tm of about 200° C., a tensile strength of 16 MPa, an elongation at break of 800% and an elastic modulus of 30 MPa, is ground and 40 g of fine powder are placed in the apparatus described in Example 1.40 g of a solution in CFC-113 at 3% by weight of PFPE peroxide having the structure

in which c/d=1 and of MW 40,000 and with an average number of peroxide groups per chain equal to 27, are then added.

The mixture is stirred at room temperature. After evaporating off the CFC-113 solvent at 30° C. and under reduced pressure (20 mmHg residual), the temperature is raised to 180° C. and the mixture is left stirring at this temperature for 3 hours.

The reaction mass is cooled to room temperature and about 40 g of a product in solid form are recovered. This solid, dissolved in a suitable warm aromatic solvent (xylene), shows on $^1$H and $^{19}$F NMR analysis total conversion of the peroxide groups and the presence of PFPE segments bonded to the aromatic ring via a —CF$_2$-Aromatic bond.

$^{19}$F-NMR analysis also reveals the presence of the group —OCF$_2$— in which the CF$_2$ is directly bonded to the aromatic ring, by means of the signal at −66/−68 ppm. The comparative NMR analysis confirms that the aromatic ring bears, as sole fluorinated substituent, the substituent bonded via the sequence indicated above. Signals typical of CF$_2$—O—Ar sequences are not present.

The fluorine elemental analysis indicates a value equal to 1.8 w/w % of fluorine, corresponding to 2.9 w/w % of PFPE product present in the modified polymer structure. This value reveals that about 95% of the initial PFPE peroxide has reacted with the hydrogenated polymer matrix. The tensile strength, elongation at break and elastic modulus values for the polymer obtained are substantially similar to those for the starting polymer.

Example 7

40 g of crystalline polyethylene terephthalamide with a melting point (Tm)>400° C., prepared as reported by W. R. Sorenson and T. W. Campbell in Preparative Methods of Polymer Chemistry, pp. 84-85, are placed in a 250 ml glass reactor, equipped with a mechanical stirrer, under an inert atmosphere (nitrogen), and subsequently ground until a fine powder is obtained.

45 g of a solution in CFC-113 at 3% by weight of PFPE peroxide having the structure

$CF_3O(C_2F_4O)_c(CF_2O)_d(O)_{27}$—COF in which c/d=1 and of MW=40,000 and with a mean number of peroxide groups per chain equal to 27, are placed in the reactor.

The mixture is stirred for 2 hours at room temperature. After evaporating off the CFC-113 solvent at 30° C. and under reduced pressure (20 mmHg residual), the temperature is raised to 220° C. and the mixture is left stirring at this temperature for 3 hours. The reaction mass is cooled to room temperature and about 38 g of product in powder form are recovered.

The abovementioned product, dissolved in sulfuric acid, reveals on $^1H$ and $^{19}F$ NMR analysis total conversion of the peroxide groups and shows the presence of PFPE chains bonded to the aromatic ring via a —$CF_2$-Aromatic bond.

$^{19}F$-NMR analysis also reveals the presence of the group —$OCF_2$— in which the $CF_2$ is directly bonded to the aromatic ring, by means of the signal at −66/−68 ppm. The comparative NMR analysis confirms that the aromatic ring bears, as sole fluorinated substituent, the substituent bonded via the sequence indicated above. Signals typical of $CF_2$—O—Ar sequences are not present.

The fluorine elemental analysis indicates a value equal to 2 w/w %, corresponding to 3.2 w/w % of PFPE product present in the modified polymer structure.

This value reveals that about 94% of the initial PFPE peroxide has reacted with the polymer matrix.

Example 8

40 g of crystalline poly(N,N'-polyethylene terephthalamide) with a melting point (Tm) of 220° C., prepared as reported by W. R. Sorenson and T. W. Campbell in Preparative Methods of Polymer Chemistry, pp. 85-86, are placed in a 250 ml glass reactor, equipped with a mechanical stirrer, under an inert atmosphere (nitrogen).

45 g of a solution in CFC 113 at 3% by weight of PFPE peroxide having the structure

$CF_3O(C_2F_4O)_c(CF_2O)_d(O)_{27}$—COF in which c/d=1 and of MW 40,000 and with a mean number of peroxide groups per chain equal to 27 are placed in the reactor.

The mixture is stirred for 2 hours at room temperature. After evaporating off the CFC 113 solvent at 30° C. and under reduced pressure, the temperature is raised to 250° C. and the molten mass is left stirring at this temperature for 3 hours.

The reaction mass is cooled to room temperature and about 40 g of product in the form of a transparent solid are recovered. The abovementioned product, dissolved in deuterated acetone, reveals on $^1H$ and $^{19}F$ NMR analysis total conversion of the peroxide groups and shows the presence of PFPE chains bonded to the aromatic ring via a —$CF_2$-Aromatic bond.

$^{19}F$-NMR analysis also reveals the presence of the —$OCF_2$— group in which the $CF_2$ is directly bonded to the aromatic ring, by means of the signal at −66/−68 ppm. The comparative NMR analysis confirms that the aromatic ring bears, as sole fluorinated substituent, the substituent bonded via the sequence indicated above. Signals typical of $CF_2$—O—Ar sequences are not present.

The fluorine elemental analysis indicates a value equal to 1.9 w/w %, corresponding to 3.0 w/w % of PFPE product present in the modified polymer structure.

This value reveals that about 90% of the initial PFPE peroxide has reacted with the polymer matrix.

Example 9 (Comparative)

In accordance with that described in U.S. Pat. No. 5,109,103, a polyester containing perfluoropolyether segments is prepared by reacting 48.5 g (0.25 mol) of dimethyl terephthalate, 36 g (0.4 mol) of 1,4-butanediol, 100 g of polyoxytetramethylene glycol (MW 1,000, 0.1 mol) and 8 g (0.005 mol) of PFPE diester having the structure

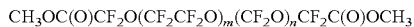
$CH_3OC(O)CF_2O(CF_2CF_2O)_m(CF_2O)_nCF_2C(O)OCH_3$ with a number-average molecular weight of 1,500.

NMR analysis confirms the presence of PFPE chains bonded to the polymer structure via primary ester bonds (the PFPE chain being directly bonded to the carbonyl group).

$^{19}F$-NMR analysis also reveals the presence of the —$OCF_2$— group in which the $CF_2$ is directly bonded to the aromatic ring, by means of the signal at −66/−68 ppm. The comparative NMR analysis confirms that the aromatic ring bears, as sole fluorinated substituent, a substituent bonded via the sequence indicated above. Signals typical of $CF_2$—O—Ar sequences are not present.

The fluorine elemental analysis indicates a value equal to 2.6 w/w %, corresponding to 4.4 w/w % of PFPE product present in the modified polymer structure.

Example 10 (Comparative)

In accordance with that described in U.S. Pat. No. 5,109,103 in the name of the Applicant, a polyester containing perfluoropolyether segments is prepared by reacting 48.5 g (0.25 mol) of dimethyl terephthalate, 36 g (0.4 mol) of 1,4-butanediol, 100 g (0.1 mol) of polyoxytetramethylene glycol (molecular weight equal to 1,000) and 8 g (0.005 mol) of PFPE diol having the structure

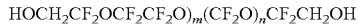
$HOCH_2CF_2OCF_2CF_2O)_m(CF_2O)_nCF_2CH_2OH$ with m/n=2 and a number-average molecular weight of 1,500.

The NMR analysis confirms the presence of PFPE chains bonded to the polymer structure via primary ester bonds (the PFPE chain being separated from the carbonyl group by an $OCH_2$ segment).

The fluorine elemental analysis indicates a value equal to 2.5 w/w %, corresponding to about 4.5 w/w % of PFPE product present in the polymer structure.

Example 11

Following the known teaching of the prior art, a polyester is prepared by reacting 97 g (0.5 mol) of dimethyl terephthalate, 49.6 g (0.8 mol) of ethylene glycol and 200 g (0.2 mol) of polyoxytetramethylene glycol (PTMEG) having a molecular weight of 1,000. The polymer thus obtained has a Tm of about 200° C.

The polymer is then ground and 40 g of fine powder is placed in the apparatus described in Example 1.

40 g of a solution in CFC-113 at 3% by weight of PFPE peroxide having the structure

$$CF_3O(C_2F_4O)_c(CF_2O)_d(O)_{27}-COF$$

in which c/d=1 and of MW 40,000 and with a mean number of peroxide groups per chain equal to 27, are successively added.

The mixture is left stirring at room temperature. After evaporating off the CFC-113 solvent at 30° C. and under reduced pressure (20 mmHg residual), the temperature is raised to 180° C. and the mixture is left stirring at this temperature for 3 hours.

The reaction mass is cooled to room temperature and about 40 g of a product in solid form are recovered. This product, dissolved in a suitable warm aromatic solvent (xylene), shows on $^1H$ and $^{19}F$ NMR analysis total conversion of the peroxide groups and the presence of PFPE segments bonded to the aromatic ring via a —$CF_2$-Aromatic bond.

$^{19}F$-NMR analysis also reveals the presence of the —$OCF_2$— group in which the $CF_2$ is directly bonded to the aromatic ring, by means of the signal at −66/−68 ppm. The comparative NMR analysis confirms that the aromatic ring bears, as sole fluorinated substituent, the substituent bonded via the sequence indicated above. Signals typical of $CF_2$—O—Ar sequences are not present.

The fluorine elemental analysis indicates a value equal to 1.8 w/w % of fluorine, corresponding to about 2.9 w/w % of PFPE product present in the modified polymer structure.

Example 12 (Comparative)

In accordance with that described in U.S. Pat. No. 5,109, 103 in the name of the Applicant, a polyester containing perfluoropolyether segments is prepared by reacting 48.5 g (0.25 mol) of dimethyl terephthalate, 30 g (0.48 mol) of ethylene glycol, 100 g (MW 1,000, 0.1 mol) of polyoxytetramethylene glycol and 8 g (0.005 mol) of PFPE diester having the structure $$CH_3OC(O)CF_2O(CF_2CF_2O)_m(CF_2O)_nCF_2C(O)OCH_3$$

with m/n=2 and a number-average molecular weight of 1,500.

The NMR analysis confirms the presence of PFPE chains bonded to the polymer structure via primary ester bonds (the PFPE chain being directly bonded to the carbonyl group).

The fluorine elemental analysis indicates a value equal to 2.4 w/w %, corresponding to 4.3 w/w % of PFPE product present in the modified polymer structure.

Example 13 (Comparative)

50 g of polyethylene terephthalamide powder of Example 7 with a melting point of greater than 400° C. and 50 g of a solution of CFC-113 at 3% of a perfluoropolyether polyamide described in U.S. Pat. No. 4,278,776, obtained by polycondensation of hexamethylenediamine with ROOC—$CF_2$ 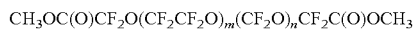 $(OCF_2CF_2)_n(OCF_2)_mOCF_2COOR$ in which m/n=1, m and n being such that the number-average molecular weight is 2,000 and R=$C_2H_5$, are placed in the apparatus described previously.

The mixture is left stirring at room temperature. After evaporating off the solvent at 30° C. and under reduced pressure (20 mmHg) the temperature is raised to 200° C. and the powder is left stirring for one hour.

The reaction mass is cooled to room temperature and about 48 g of a product in solid form are recovered. The fluorine elemental analysis shows a value equal to 1.8 w/w % of fluorine, corresponding to about 2.9 w/w % of PFPE product present in the modified polymer structure.

Hydrolysis Test

Example 14

In accordance with the method described previously, a number of polymer materials of the present invention are subjected to the hydrolysis test under conditions of spontaneous pH, unless otherwise indicated. The results of these hydrolysis tests are collated in the following table, in which the first column gives the number of the reference example relating to the polymer subjected to the hydrolysis test:

| Example | Temperature (° C.) | Time (h) | Hydrolysis (%) |
|---|---|---|---|
| 4 | 80 | 240 | n.d.* |
| 5 (comparative) | 80 | 240 | 1.5% |
| 6 | 80 | 240 | n.d.* |
| 7 | 80 | 240 | n.d.* |
| 8 | 80 | 240 | n.d.* |
| 9 (comparative) | 80 | 240 | 20 |
| 9 (comparative) | 80** | 240 | 50 |
| 10 (comparative) | 80 | 240 | 2 |
| 10 (comparative) | 100 | 240 | 10 |
| 11 | 80 | 240 | n.d. |
| 12 (comparative) | 80 | 240 | 9 |
| 12 (comparative) | 100 | 240 | 25 |
| 12 (comparative) | 80** | 240 | 32 |
| 13 (comparative) | 80 | 240 | 4 |

*n.d. = below the analytical limit
**hydrolysis performed at pH 10

Heat Stability Test

Example 15

In accordance with the method described previously, a number of polymer materials of the present invention are subjected to the heat stability test.

The results of these heat stability tests are collated in the following table, in which the first column gives the number of the reference example relating to the polymer subjected to the hydrolysis test:

| Example | Temperature (° C.) | Time (h) | Decomposition (%) |
|---|---|---|---|
| 1 | 300 | 24 | n.d. |
| 2 | 300 | 24 | n.d. |
| 3 (comparative) | 300 | 24 | 35 |
| 3 (comparative) | 250 | 24 | 2 |
| 4 | 250 | 24 | n.d. |
| 5 (comparative) | 250 | 24 | 3 |
| 1 | 250 | 96 | n.d. |
| 2 | 250 | 96 | n.d. |
| 3 (comparative) | 250 | 96 | 7 |
| 4 | 250 | 96 | n.d. |
| 5 (comparative) | 250 | 96 | 13 |

Contact Angle Test

Example 16

In accordance with the method described previously, a number of polymer materials of the present invention are subjected to the contact angle test.

The results of this test are collated in the following table, in which the first column gives the number of the reference example relating to the polymer subjected to the contact angle test:

| Example | Polymer | Contact angle vs. water | Contact angle vs. hexadecane |
|---|---|---|---|
| 4 | peroxide-treated P(ET/EIT) | 81 ± 2 | 48 ± 3 |
|   | native P(ET/EIT) | 59 ± 5 | wetted |
| 11 | peroxide-treated PET | 105 ± 1 | 67 ± 1 |
|   | native PET | 83 ± 1 | wetted |
| 2 | peroxide-treated PPS | 114 ± 1 | 69 ± 1 |
|   | native PPS | 78 ± 2 | wetted |

Release Test

Example 17 (Comparative)

According to the teaching of the prior art, a hydrogenated polymer is modified with a fluorinated additive according to the following procedure.

50 g of poly(N,N'-diethylene terephthalamide) of Example 7 (Tm=220° C.) and 1.5 g of Fluorolink® PA 100 E sold by Solvay Solexis (polyamide containing perfluoropolyether chains) are placed in the apparatus described previously. The mixture is heated gradually under nitrogen up to 250° C. and is left stirring for about 15 minutes. The material is then cooled to room temperature. 46 g of a product in solid form are recovered, which, on fluorine elemental analysis, gives a value equal to 1.7 w/w %, corresponding to 2.9 w/w % of fluorinated polyamide present in the hydrogenated polymer structure.

Example 18

The polymer materials containing PFPE synthesized in Example 8 and in Example 17 (Comparative) are subjected to an extraction test according to the following procedure.

5 g of polymer material are dissolved in 50 ml of a 1/9 (w/w) dimethylformamide (DMF)/THF mixture. A solution that is slightly opalescent at room temperature is obtained. CFC-113 is added to the said solution. An initial cloudiness of the solution is observed. Further addition of CFC-113 leads to gradual precipitation of the polymer. The precipitation is complete when about 200 ml of fluorinated solvent have been added. The precipitate is separated from the mixture by filtration, and the organic phase is washed with water to remove the DMF. The resulting organic phase is then treated with sodium sulfate and concentrated by partial distillation of the CFC-113 and of the THF. The concentrated solution is analysed by $^{19}$F-NMR to reveal any possible extracted fluorinated products. The polymer of Example 7, subjected to the extraction process described above, does not show any presence of fluorinated product in the organic extraction solvent.

The polymer of Example 15 (Comparative) shows the presence of 30 mg of fluorinated product (Fluorolink PA 100) in the organic extraction solvent, equal to 21% of the amount initially added.

The invention claimed is:

1. Aromatic hydrogenated polymers comprising perfluoropolyether (PFPE) chains bonded to the aromatic rings forming sequences that are randomly distributed in the polymer structure, having the formula (I):

$$(T_1-CF_2O-Rf-CF_2)_n-T_3 \qquad (I)$$

wherein:
n is an integer from 1 to 10,
$T_1$ has the following meanings:
   optionally substituted aromatic group,
   several optionally substituted condensed aromatic groups,
$T_1$ being an aromatic ring of the backbone of the hydrogenated polymer; $T_3$ optionally being equal to $T_1$, or alternatively a functional group: —COON or —COF, and Rf is a (per)fluoropolyoxyalkylene chain,
wherein the starting hydrogenated aromatic polymers are obtained by polycondensation, stepwise polyaddition, or polyaddition of cyclic monomers in which the ring is formed from at least 3 atoms.

2. The aromatic hydrogenated polymers according to claim 1, wherein the Rf chain has a number-average molecular weight of between 500 and 10,000.

3. The aromatic hydrogenated polymers according to claim 1, wherein Rf is a (per)fluoropolyoxyalkylene chain constituted by one or more repeating units, randomly distributed in the chain, having the following structure (CFXO), $(C_2F_4O)$, $(CF_2CF_2CF_2O)$, $(CF_2CF_2CF_2CF_2O)$, $(CR_5R_6CF_2CF_2O)$, or $(C_3F_6O)$, in which $(C_3F_6O)$ represents a unit of formula: —$(CF_2CF(CF_3)O)$— or —$(CF(CF_3)CF_2O)$—; X being F or $CF_3$; $R_5$ and $R_6$, being identical or different, are selected from the group consisting of H, Cl, and perfluoroalkyl containing from 1 to 4 carbon atoms.

4. The aromatic hydrogenated polymers according to claim 3, wherein the perfluoropolyether chain Rf is selected from the group consisting of the following structures:

(A) —$(CF_2CF(CF_3)O)_a(CFXO)_b$— or —$CF_2CF(CF_3)O)_a$ $(CFXO)_b$—$CF_2(R''f)CF_2$—O—$(CF_2CF(CF_3)O)_a$ $(CFXO)_b$—
   wherein R''f is a fluoroalkenyl group containing from 1 to 4 carbon atoms; X is F or $CF_3$; a and b are integers such that the number-average molecular weight is between 500 and 10,000; a/b is between 10 and 100;

(B) —$(CF_2CF_2O)_c(CF_2O)_d(CF_2(CF_2)_zO)_h$—
   wherein c, d and h are integers such that the number-average molecular weight is between 500 and 10,000; c/d is between 0.1 and 10; h/(c+d) is between 0 and 0.05; z is 2 or 3; h optionally being equal to zero;

(C) —$(C_3F_6O)_e(CF_2CF_2O)_f(CFXO)_g$—
   wherein X is F or $CF_3$; e, f and g are integers such that the number-average molecular weight is between 500 and 10,000; e/(f+g) is between 0.1 and 10; f/g is between 2 and 10;

(D) —$(CF_2(CF_2)_zO)_s$—
   wherein s is an integer such as to give the molecular weight between 500 and 10,000; z is 2 or 3;

(E) —$(CR_5R_6CF_2CF_2O)_{j'}$— or —$(CR_5R_6CF_2CF_2O)_{p'}$— R''f-O$(CR_5R_6CF_2CF_2O)_{q'}$—
   wherein $R_5$ and $R_6$ are identical or different and are selected from the group consisting of H, Cl, and perfluoroalkyl containing from 1 to 4 carbon atoms; R''f is a fluoroalkenyl group containing from 1 to 4 carbon atoms; j', p' and q' are integers such as to have a molecular weight between 500 and 10,000;
and (F) —$(CF(CF_3)CF_2O)_{j''}$—
   j'' being an integer such as to have the molecular weight between 500 and 10,000.

5. The aromatic hydrogenated polymers according to claim 1, wherein the polymers obtained by polycondensation are selected from the group consisting of polyesters, polyamides, polyimides, polyamide-imides, polycarbonates, polyphenyl sulfides, polyphenylene oxides, polyether sulfones, polyketones, polyether ketones, polyether ether ketone, and polyarylamide; the polymers obtained by stepwise polyaddition are selected from the group consisting of polyurethanes; the polymers obtained by polyaddition of cyclic monomers in which the ring is formed from at least 3 atoms are selected from the group consisting of polyethers obtained from epoxide or oxetane monomers, polysulfides obtained from thioepoxides, and polyethers or polyamides obtained from lactones or lactams, respectively.

6. The aromatic hydrogenated polymers according to claim 1, wherein the polymers are free of residual olefinic double bonds, free of tertiary carbon atoms and are derived from monomers free of tertiary carbon atoms and of terminal olefinic double bonds.

7. A process for preparing the polymers of claim 1, comprising the reaction of a hydrogenated polymer containing optionally substituted aromatic groups with a fluorinated peroxide that generates carbon radicals and that has an oxidizing power (OP), defined as grams of active oxygen per 100 grams of peroxide, of less than 4%, by working with a molar ratio between the peroxide groups of the fluorinated peroxide and the aromatic rings of the hydrogenated polymer of less than or equal to 1, and wherein the starting hydrogenated aromatic polymers are obtained by polycondensation, stepwise polyaddition or polyaddition of cyclic monomers in which the ring is formed by at least 3 atoms.

8. The process according to claim 7, wherein the molar ratio is less than 0.5.

9. The process according to claim 7, wherein the fluorinated peroxide is a perfluoropolyether peroxide containing one or more of the following repeating units, randomly distributed in the chain, having the following structure (CFXO), $(CF_2CF_2O)$, $(CF_2CF_2CF_2O)$, $(CR_5R_6CF_2CF_2O)$, or $(C_3F_6O)$, in which $(C_3F_6O)$ represents the unit of formula: $—(CF_2CF(CF_3)O)—$ or $—(CF(CF_3)CF_2O)—$, or alternatively $(CF_2CF_2CF_2O)$, X being F or $CF_3$; $R_5$ and $R_6$, being identical or different, are selected from the group consisting of H, Cl, and perfluoroalkyl containing from 1 to 4 carbon atoms.

10. The process according to claim 7, wherein the perfluoropolyether peroxide has the following structure:

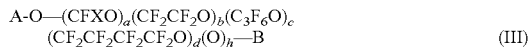

$$A-O—(CFXO)_a(CF_2CF_2O)_b(C_3F_6O)_c(CF_2CF_2CF_2CF_2O)_d(O)_h—B \quad (III)$$

wherein
A and B, being identical or different, are selected from the group consisting of $—CF_2COF$, $—CF(CF_3)COF$, $—CF_2CF_2COF$, $CF_2CF_2CF_2COF$, $—CF_2C(O)CF_3$, $—COF$; $—CF_3$, $—CF_2CF_3$, $—C_3F_7$, and $—C_4F_9$, wherein a fluorine atom is optionally replaced with a chlorine or hydrogen atom;
the indices a, b, c, d and h are integers, including zero, such that the number-average molecular weight of the perfluoropolyether peroxide of structure (III) is between 300 and 150,000, and the index h is a non-zero integer so as to give a content of peroxide bridges —O—O— or an oxidizing power (OP) of between 0.02% and 4%.

11. The process according to claim 10, wherein the perfluoropolyether peroxides are selected from the group consisting of the following categories:

(1) $Xo-O(CF_2CF_2O)_r(CF_2O)_s(O)_t—Xo'$
wherein
Xo and Xo', being identical or different, are selected from the group consisting of $—CF_2Cl$, $—CF_2CF_2Cl$, $—CF_3$, $—CF_2CF_3$, $—CF_2COF$, and $—COF$;
r, s and t are integers such that the number-average molecular weight is between 300 and 150,000; r/s is between 0.1 and 10, with s being non-zero; t is an integer such that the oxidizing power is of between 0.02% and 4%;

(2) $X1-O(CF_2CF_2O)_r(CF_2O)_s(CF(CF_3)O)_u(CF_2CF(CF_3)O)_v(O)_t—X1'$
wherein
X1 and X1' are identical or different and are selected from the group consisting of $—CF_2Cl$, $—CF_2CF_2Cl$, $—CF_2CF_3$, $—CF_3$, $—C_3F_7$, $—CF(CF_3)COF$, $—COF$, $—CF_2COF$, and $—CF_2C(O)CF_3$;
r, s, t, u and v are integers, including zero, such that the number-average molecular mass is between 300 and 150,000; t is a number such that the oxidizing power is of between 0.02% and 4%;

(3) $X2-O(CF_2CF_2O)_r(CF_2O)_s(CF_2(CF_2)_wCF_2O)_k(O)_t—X2'$
wherein
X2 and X2', which may be being identical or different, are $—CF_2COF$, or $—COF$,
w=1 or 2,
r, s, t and k are integers such that the number-average molecular weight is between 700 and 100000; r/s is between 0.2 and 10, k/(r+s) is less than 0.05, and t is an integer such that the oxidizing power is of between 0.02% and 4%.

12. The process according to claim 7, wherein the temperature is between 20° C. and 300° C., optionally in the presence of UV, and wherein, when the temperature is below 150° C., the reaction is performed in the presence of UV radiation.

13. The process according to claim 7, which is performed in the presence of solvents that are inert under the reaction conditions.

14. The process according to claim 7, wherein the aromatic hydrogenated polymer is in the form of powder or pellets, in melt form, or in the form of a manufactured product.

15. The process according to claim 7, wherein the polymers obtained by polycondensation are selected from the group consisting of polyesters, polyamides, polyimides, polyamide-imides, polycarbonates, polyphenyl sulfides, polyphenylene oxides, polyether sulfones, polyketones, polyether ketones, polyether ether ketone, and polyarylamide; the polymers obtained by stepwise polyaddition are selected from the group consisting of polyurethanes; the polymers obtained by polyaddition of cyclic monomers in which the ring is formed from at least 3 atoms are selected from the group consisting of polyethers obtained from epoxide or oxetane monomers, polysulfides obtained from thioepoxides, and polyethers or polyamides obtained from lactones or lactams, respectively.

16. The process according to claim 7, wherein the hydrogenated aromatic polymers are selected from the group consisting of polyether sulfones (PES), polyphenyl sulfides (PPS), polyimides (PI), polyphenylene oxides (PPO), polyketones, polyether ketones (PEK), polyether ether ketones (PEEK), polyester, polyamides, polyurethanes, polyarylamide, epoxy polymers, polyurethanes, and polyesters.

17. The process according to claim 7, wherein the pressure is between atmospheric and 20 atm.

18. A method for preparing manufactured products selected from the group consisting of components for mechanical parts, membranes, components for power stations, structural parts of vehicles or aircraft, components for the motor vehicle and transport industry, components for the electrical and electronic industry, and components for the chemical industry, said method comprising using the polymers of claim 1 to manufacture said products.

19. Functionalized aromatic hydrogenated polymers comprising sequences randomly distributed in the polymer structure, having the formula $$(T_1\text{-}CF_2O\text{---}Rf\text{---}CF_2)_n\text{-}A_q(T_2)_p \qquad (II)$$

which is obtained from the polymers of claim 1 when $T_3$ of the fluorinated sequences (I) is COOH or COF, via conversion of $T_3$ being —COOH or —COF into other functional groups -$A_q$-$(T_2)_p$; wherein, in formula (II), n and $T_1$ have the same meaning as defined in claim 1, A is a divalent radical between the perfluoropolyether chain Rf and the functional group $T_2$, q=0 or 1, p is an integer between 1 and 4, and $T_2$ is a reactive functional group other than —COF or —COOH, optionally containing heteroatoms.

20. A process for preparing the polymers according to claim 19 being of formula (II), comprising the conversion of the aromatic hydrogenated polymers comprising the sequences of formula (I) in which $T_3$ is COOH or COF, via amidation, reduction, nucleophilic substitution, or condensation reactions.

* * * * *